M. SPINELLO.
SCALE.
APPLICATION FILED FEB. 12, 1918.
1,285,447.
Patented Nov. 19, 1918.
Fig. I.
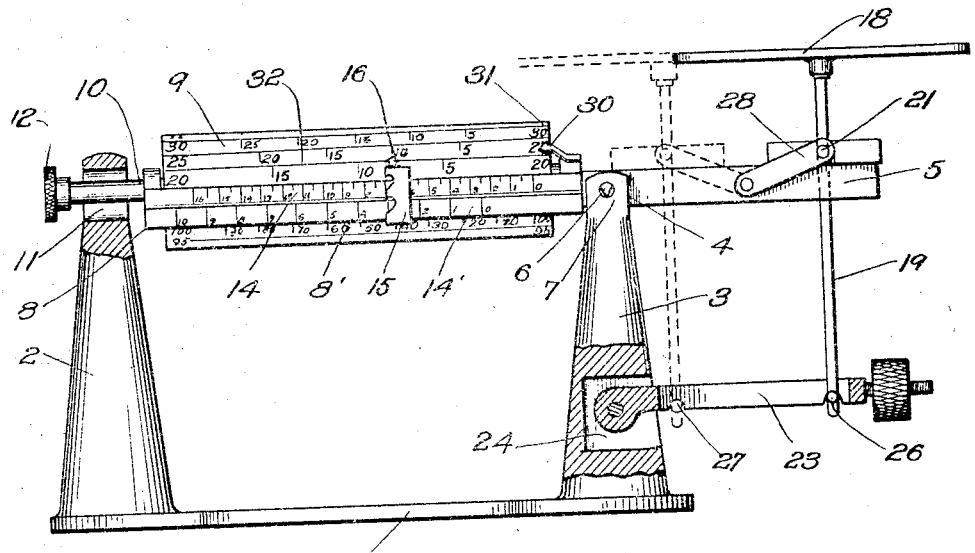
Fig. II.
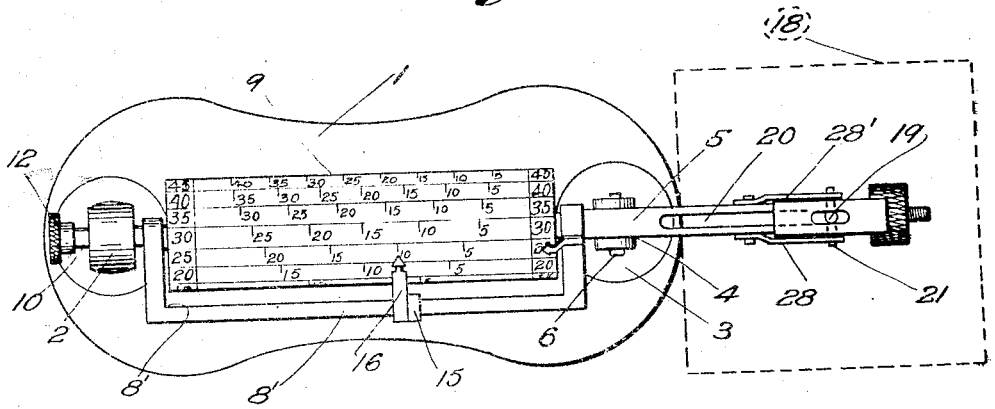
INVENTOR.
Mathew Spinello.
BY Arthur C. Brown
ATTORNEY

UNITED STATES PATENT OFFICE.

MATHEW SPINELLO, OF KANSAS CITY, MISSOURI.

SCALE.

1,285,447.  Specification of Letters Patent.  Patented Nov. 19, 1918.

Application filed February 12, 1918. Serial No. 216,682.

*To all whom it may concern:*

Be it known that I, MATHEW SPINELLO, a citizen of the United States, residing at Kansas City, in the county of Jackson and State of Missouri, have invented certain new and useful Improvements in Scales; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to computing scales, and more particularly to scales of this character whereby the selling amount of different portions weighed thereon may be readily computed whether it is being sold at so much per pound or at so much per ounce; the principle object of the invention being to provide scales of this character whereon by altering the length of the load arm, that is, the distance between the load and fulcrum of the beam, computing may be made, as above stated, and without necessitating any change in the computing cylinder used, or in the sliding poise for effecting the balance of the scale beam and for indicating selling amounts on the computing cylinder.

It is a further object of the invention to so mount the scale plate or weighing pan on the weighing beam that it may be quickly and accurately adjusted to different supporting points thereon which are at such proportionate distance from the beam fulcrum that when in one position, the poise will indicate the weight in ounces and the price when sold at so much per ounce and when supported at the other position, will likewise indicate the weight in pounds and the selling price at so much per pound.

In accomplishing these objects I have provided improved details of structure, the preferred forms of which are illustrated in the accompanying drawings, wherein:—

Figure I is a side elevation of a scale constructed according to the present invention.

Fig. II is a plan view of the same.

Referring more in detail to the drawings:—

1 designates a flat base plate whereon the scale parts are mounted and which is adapted for support on any suitable horizontal base or foundation.

Rising from opposite ends of the plate are posts or standards 2 and 3; the standard 3 being provided at its upper end with a slot 4 for receiving a horizontally mounted scale beam 5 which is pivotally supported within the slot by means of a trunnion 6 that extends transversely through the beam and is pivotally mounted at its opposite ends within openings 7 deposed in horizontal alinement in the post at opposite sides of the slot 4.

Secured to one end of the beam 5 is a rectangular, horizontally disposed supporting frame 8, in which a computing cylinder 9 is revolubly mounted; the cylinder being fixed upon a central shaft 10 that is journaled at its opposite ends in the ends of the frame 8 and its end farthest from the standard 3 is extended through and beyond the frame, and also through and is vertically movable within a guide slot 11 in the upper end of the standard 2. At its end the shaft is provided with a thumb knot or knob 12 by which it may be revolved to turn the cylinder.

The forward rail 8' of the cylinder frame is provided with upper and lower graduated columns 14—14' whereon the weight of articles placed on the scale pan presently described may be read in ounces or in pounds, according to the location of the pan, and slidably mounted on the rail 8' so that it may be moved therealong to effect a balance of the beam, is a poise or weight 15, which at one side has a pointer 16 movable adjacent the graduated columns 14—14' to indicate the weight of the article either in pounds or ounces, according to the scale being used at the particular weighing, and at its upper side is provided with a pointer 16 which extends adjacent the cylinder 9 to designate certain readings thereon.

Adjustably mounted on the end of the scale beam opposite the computing cylinder is a scale plate or pan 18, the latter being mounted on the upper end of a post 19 which extends vertically downward from the pan and through an elongated slot 20, longitudinally located in the beam and is supported from the beam by a transverse trunnion 21 that extends through the post and at its ends is pivotally supported on the beam at opposite sides of the slot.

The means for retaining the post 19 in vertical position, so that accurate weights may be made of articles placed on the plate 18, comprises an arm 23 that is pivotally mounted at its inner end within a slot 24 located in the post 3 below the slot 4, and extends parallel with and beneath the weight arm of the beam 5.

The arm is provided with a slot 25 corresponding to the slot 21 in the beam 5, through which the lower end of the post 19 extends and the post at its lower end is provided with a transverse pin 26 that is adapted to seat at its ends downwardly opening sockets or notches 27 in the under side of the arm so that the post will be retained in vertical position; the weight of the arm being sufficient to retain the same in locked relation with the post.

The trunnion 21 which pivotally supports the scale pan on the beam 5 is normally retained at such distance from the fulcrum of the scale beam that when an article is placed on the scale pan and a balance of the beam is made by the poise 16 the weight of the article will be indicated in ounces, but the parts are so arranged that the point of support of the pan may be moved closer to the fulcrum so that the weight of an article be shown in pounds. The means used for locating the supporting trunnion at the required distance from the fulcrum and for retaining the same at such position that the poise will indicate correct weights on the graduated scales comprises a pair of links 28—28' that are pivotally fixed at their upper ends to the opposite ends of the trunnion 21, and at their lower end are pivotally mounted on the scale beam 5, and the length of the links is such that when extending outwardly from their pivotal point on the beam, the scale pan will be supported thereby at such a distance from the beam fulcrum that the weight of an article placed thereon will be indicated in ounces by the location of the poise relative to the scale 14, and when the pan is moved to its opposite limit it will be supported at such a distance from the fulcrum that the balancing poise will indicate the weight of the article in pounds according to its location relative to the markings on the scale 14'.

When the pan is moved to its inner position, the pin 26 is located in sockets 27' in the arm 25, vertically below the supporting point of the trunnion 21 on the beam 5 so that the post when in this position is also maintained perpendicular and accurate weighing may be also made.

Mounted at one end of the frame 8 is a pointer 30 which coöperates with a series of numerals on the outer surface of the cylinder 9. Extending circumferentially around the end of the cylinder adjacent the pointer 30 is a column of numerals 31 constituting price per pound or ounce numerals, and coöperating therewith are longitudinal rows of numerals 32 which indicate the cost of the article at so much per ounce or pound. These later numerals are adapted to coöperate with the pointer 16 of the poise 15 so as to indicate the price of the article being weighed at a certain price per ounce or per pound.

If the price of an article is four cents per pound, for instance, the cylinder is turned to bring the numeral "4" of the column 31 into alinement with the indicator 30, when, the poise having been adjusted to indicate the weight of the article—say three pounds—the pointer 15 will indicate the total cost price of the article to be twelve cents by pointing to the numeral "12" in the longitudinal row 32 in alinement with the numeral "4" in the row or column 31.

With the parts so arranged if it is desired to weigh small portions of less than a pound, the scale pan is moved to its outer limit on the scale beam as shown in Fig. I the article placed on the pan, and the poise moved along the beam 8' until a balance is made, and by referring to the upper graduated column 14 on the beam the weight is shown in ounces.

If portions of more than a pound are to be weighed the scale pan is moved on its pivotal mounting to a position closer to the beam fulcrum as shown in dotted lines, Fig. I and when a balance is made by shifting the poise along the beam 8' the readings are indicated in pounds in the lower graduated column 14'.

The graduated scales 14—14' are so located in the scale beam that when the pan is moved to its supporting point the closer to the fulcrum the poise will balance the beam when it is located at the —0— reading on the scale 14 and when moved to the outer supporting post a balance will be made when the poise shows an —0— reading on the scale 14'.

It will be seen that by so constructing the device quick and accurate adjustment of the scale pan may be made so that articles may be weighed and selling amounts computed according to price per pound or per ounce.

Having thus described my invention, what I claim as new therein, and desire to secure by Letters-Patent, is:—

1. A scale comprising a pivotally mounted beam, a scale pan adapted for support at one end thereof at different distances from the pivotal point, and a balancing poise slidably mounted on the opposite end of the beam; said beam having separate scale markings thereon for use according to the different locations of the scale pan.

2. A scale comprising a pivotally mounted beam, a scale pan having a trunnion adapted for support on one end of the beam at different distances from the pivoted point, a link fixed to the beam and to the trunnion movable to locate the trunnion at different distances from the pivotal point of the beam;

said beam having separate scale markings thereon at its opposite end for use according to the different locations of the scale pan and a sliding poise mounted on the beam which operates as a pointer for each of the different scales.

3. A scale comprising a base member, a standard on the base, a scale beam pivotally mounted by the standard, a scale pan having a supporting trunnion adjustable at one end of the beam to different distances from the pivotal point, a link pivotally fixed to the beam and to the trunnion movable to locate the trunnion at a distance close to or relatively farther from the pivotal point of the beam; said beam having separate scale markings thereon opposite the pan end located and graduated for use according to the different locations of the pan and a sliding poise mounted on the beam which operates as a pointer for each of the different scales.

4. A scale comprising a base member, a standard mounted on the base, a horizontal scale beam pivotally mounted on the standard having a longitudinally extending slot at one end, a scale pan having a supporting post extending vertically through said slot, a supporting trunnion fixed to the post and movable to support the pan at different distances from the pivotal point of the beam, an arm pivotally mounted at one end to the standard below and extending parallel with the scale beam and having a slot therein for receiving the lower end of the said pan post and having adjustable connection with the arm to retain the post in vertical position at its different locations and a sliding poise mounted on the beam at the opposite side of the pivotal point.

5. A scale comprising a base member a standard mounted on the base, a horizontal scale beam pivotally mounted on the standard having a longitudinally extending slot therein, a scale pan, a post for supporting said pan extending vertically through said slot, a trunnion for said post pivotally mounted on said beam, a link fixed to said beam and to said trunnion, and movable to locate the latter at different distances from the pivotal point of the beam, an arm pivotally mounted below the beam and extending parallel with the scale beam and having a slot therein corresponding to the beam slot for receiving the lower end of said post, a trunnion on the lower end of the post having adjustable connection with the arm to retain the post in vertical position at its different mountings; said beam having separate scale markings therein opposite the pan end located and graduated for use according to the different locations of the pan and a sliding poise mounted on the beam which operates as a pointer for each of the different scales.

6. A computing scale comprising a base member, a standard mounted on the base member, a horizontal scale beam pivotally mounted on the standard, a scale pan having a supporting trunnion adjustable on the beam at one end toward or from the pivotal point, a link fixed pivotally to the beam and to the trunnion, movable to locate and retain the latter at certain spaced distances from the pivotal point of the beam said beam having separate scale markings therein at the opposite side of the pivotal point, for use according to the different locations of the pan, a sliding poise mounted on the beam which operates as a pointer for each of the different scales, a computing cylinder mounted adjacent the beam having columns of selling price markings thereon located coöperatively with the markings on the scale beam and a sliding poise mounted on the beam which acts as a pointer for each of the different scales on the beam or computing cylinder.

In testimony whereof I affix my signature.

MATHEW SPINELLO.

Copies of this patent may be obtained for five cents each, by addressing the "Commissioner of Patents, Washington, D. C."